(12) United States Patent
Brailean et al.

(10) Patent No.: US 8,010,631 B2
(45) Date of Patent: Aug. 30, 2011

(54) METHOD AND SYSTEM FOR PROVIDING IMAGE, VIDEO AND AUDIO DATA TO REMOTE USERS

(75) Inventors: James C. Brailean, La Jolla, CA (US); Marshall Merrifield, San Diego, CA (US); Joel D. Underwood, San Diego, CA (US); Douglas C. Hoffman, San Diego, CA (US)

(73) Assignee: Tiger Ventures, LLC, San Diego, CA (US)

( * ) Notice: Subject to any disclaimer, the term of this patent is extended or adjusted under 35 U.S.C. 154(b) by 857 days.

(21) Appl. No.: 11/973,211

(22) Filed: Oct. 9, 2007

(65) Prior Publication Data

US 2009/0077601 A1    Mar. 19, 2009

(51) Int. Cl.
*G06F 15/16* (2006.01)
*H04N 7/173* (2011.01)

(52) U.S. Cl. ........ 709/219; 709/204; 709/218; 709/220; 725/105; 379/37; 379/45; 379/38; 379/44; 379/42; 348/152; 348/156; 348/153; 348/154; 348/143

(58) Field of Classification Search .................. 709/219, 709/204, 218, 220
See application file for complete search history.

(56) References Cited

U.S. PATENT DOCUMENTS

| | | | |
|---|---|---|---|
| 6,271,752 B1 | 8/2001 | Vaios | |
| 6,658,091 B1 | 12/2003 | Naidoo et al. | |
| 6,771,741 B2 | 8/2004 | Kliland | |
| 6,970,183 B1 | 11/2005 | Monroe | |
| 7,373,395 B2 * | 5/2008 | Brailean et al. | 709/219 |

* cited by examiner

*Primary Examiner* — Jude J Jean Gilles
(74) *Attorney, Agent, or Firm* — Patents+TMS, P.C.

(57) ABSTRACT

A system and method of notifying a remote client of a sensor triggering event and providing data related to the sensor triggering event to the remote client. The method has the steps of receiving a first notification signal indicating that a sensor has been triggered; identifying a data recording device associated with the triggered sensor wherein the data recording device records video data; identifying a client device designated to receive the video data when the sensor has been triggered; transmitting to the client device a second notification signal indicating that the sensor has been triggered; receiving an acknowledgement signal from the client device; and transmitting the video data to the client device.

47 Claims, 8 Drawing Sheets

| Client Device | IMEI | Mfr. Ser. No. | Video Servers | Cameras | Rules | Secret | Reg. Key |
|---|---|---|---|---|---|---|---|
| 0000001 | xxxxxx | xxxxxx | 1 | 1,3,5 | Sensor 5 Trigger | xxxxxx | xxxxxx |
| 0000002 | N/A | xxxxxx | 3 | 9 | Sensors 12 or 15 | xxxxxx | xxxxxx |
| . . . . | . . . . | . . . . | . . . . | . . . . | . . . . | . . . . | . . . . |
| xxxxxx | xxxxxx | xxxxxx | xxxxxx | xxxxxx | xxxxxx | xxxxxx | xxxxxx |

FIG. 6

METHOD AND SYSTEM FOR PROVIDING IMAGE, VIDEO AND AUDIO DATA TO REMOTE USERS

RELATED APPLICATIONS

The present application claims the benefit of priority under 35 U.S.C. §119(e) to U.S. Provisional Patent Application Ser. No. 60/541,960 entitled "METHOD AND SYSTEM FOR PROVIDING INFORMATION TO REMOTE CLIENTS," filed on Feb. 4, 2004, the entirety of which is incorporated by reference herein.

BACKGROUND OF THE INVENTION

1. Field of the Invention

The present invention relates to a method and system for providing information, such as image, video and/or audio data, to remote clients. More particularly, the invention relates to a method and system for detecting an event, recording visual and/or audio information associated with the event, alerting a remote client of the event, and transmitting the visual and/or audio information to a remote client device (e.g., PC, PDA or cellular telephone).

2. Description of the Related Technology

Analog Closed Circuit Television (CCTV) systems have been used for remote presence and security viewing for almost fifty years. By utilizing shielded coaxial cable as the medium to transmit the video from an analog camera to a central location for viewing on a television monitor, these networks are secure from unauthorized clients gaining access to the video. The cost of installing the shielded coaxial cable, however, prohibits the wide area transmission of this video. Generally, a central viewing room is located on the premises where the cameras are installed. The video can be viewed off the premises or archived by transferring the video taken for each camera to a videotape via a videocassette recorder (VCR). This mode of transmission and storage of video is inefficient, as it requires a large amount of human intervention. Also, since CCTV systems are closed to anyone outside of the central viewing room, off site monitoring of the video is not possible. Controlling which clients are allowed access to the central viewing room is the only way to control access to the video from any camera.

With the advent of the Internet, networked digital video cameras are now available. These digital video cameras transmit their captured video using Internet Protocol (IP) technologies. Clients authorized to access the digital communications network (e.g., Local Area Network (LAN), Wide Area Network (WAN), World Wide Web ("www" or "Internet"), to which the cameras are communicatively linked, can view the video from a particular camera from their Personal Computer (PC). Access to the video is controlled utilizing technologies developed for the Internet. A client, utilizing a web browser on their personal computer, can access the video captured by a particular camera by accessing that camera via a web page or directly accessing the camera if is "web-server enabled." Web-server enabled cameras are assigned their own unique URL address and contain the necessary circuitry and embedded software so that clients can directly access their video feed via the Internet. Such cameras are well known in the art. Similarly, techniques for accessing the video feed of a camera via a designated web page or portal are also well known in the art. Typically, in order to access these cameras or web portals, a client is authenticated through a client username and password that is unique to that client. The system can be compromised if an unauthorized user learns the username and password of an authorized client.

Digital communication networks also allow video captured by digital and/or analog cameras to be made accessible to clients not physically located on the premises where the video is captured. This ability to transmit the video via digital communication networks has greatly improved the efficiency for archiving and viewing the captured video by offsite clients. However, such systems are vulnerable to attack. For example, Internet hackers can steal usernames and passwords and gain access to the content being transmitted by these cameras. This is a major problem that has forced many corporations and personal clients to employ encryption technologies that increase the cost of the service.

In an attempt to conserve the bandwidth required to transmit video over an IP network, digital cameras have utilized data compression techniques. Generally, through known video compression techniques, the size of the video data to be transmitted over the network can be reduced by a factor of 100 to 140 times the size of the original video data. This greatly reduces the cost and bandwidth requirements of transmitting the video. In order for a client to view the video on their personal computer (PC), the client must have the corresponding decompression software available to them. Since the approach used by most camera companies is proprietary, this software must be loaded onto the PC prior to the client accessing the data from a camera. If a client has cameras on their network that are manufactured by different sources, these cameras will require their own stand-alone decompression software. This adds to the complexity in trying to use the system, since clients must know which compression/decompression software is required for each camera. Also, it is not currently possible for a client to access remote cameras using a device other than a PC. New devices such as "Smart Cell Phones," however, have the capability to view images and video as long as the data compression and transmission conforms to known standards adopted for such phones. However, cellular phones do not currently provide clients with the ability to access remote cameras customized specifically for their viewing.

Additionally, it would be desirable to alert or notify remote clients of the occurrence of a pre-specified event or phenomenon and thereafter provide live, real-time (or as close as the transmission speed will allow) visual and/or audio data to the remote clients who are registered or authorized to receive such alerts and corresponding data. Currently, neither cell phones, nor any other type of remote client devices (e.g., PC's, PDA's) for that matter, provide this functionality to clients.

Today's digital cameras have greatly reduced the cost of installation. Since these cameras can utilize the IP data format to transmit the video, they can be placed anywhere there is an Ethernet jack for connection to a digital communications network (e.g., LAN, WAN or Internet). Analog cameras require a shielded coaxial cable to be installed for each camera. However, with the use of appropriate analog-to-digital (A/D) converters and processing circuitry to format, compress, and transmit data across a digital communications network, analog cameras can also be placed at remote locations and accessed via a digital communications network. This flexibility of being able to place cameras at various designated remote locations and connect the cameras to a network, potentially allows clients to obtain visual information in accordance with various scenarios or objectives. One particular scenario or objective could be the placing of a camera to monitor who enters a particular door over a week-long period.

Another example is the placing of a camera to record how many cars park in a certain location during a 12-hour period. This flexibility also presents a problem, however, since digital cameras can potentially be placed in areas that infringe upon the privacy rights of individuals or for other illegal purposes. Without the knowledge of the network administrator, a client with the intent of spying on individuals or private locations could move or place cameras at improper locations.

BRIEF SUMMARY OF THE INVENTION

The present invention addresses the above and other needs by providing a novel method and system for transmitting recorded information from one or more data recording devices to one or more remote clients via a digital communications network.

In one embodiment of the invention, method and system monitors one or more sensors (e.g., motion, temperature, light) associated with one or more cameras (digital and/or analog), connected to a digital communications network, and upon triggering of a sensor, notifies a designated remote client of the sensor-triggering event by sending a message to a remote device associated with the remote client, and thereafter provides visual and/or audio information from a data capture device (e.g., video camera) associated with the triggered sensor to the client's remote device, via the digital communications network.

In another embodiment, the system may include cameras as well as other types of data recording devices, such as digital video recorders, audio recorders, temperature measuring and recording devices, chemical analyzers, etc., that are connected to the digital communications network and associated with one or more sensors.

In a further embodiment, the invention provides a client with the capability of accessing content from a network of analog cameras, digital cameras or both, utilizing either a LAN, WAN, wireless network or a combination of networks and either a PC, Laptop, Personal Digital Assistant (PDA), cell phone or custom networked computing device that has a general or application-specific processor and a display.

In another embodiment, the invention includes a client authentication and authorization protocol to provide secure access to the network of cameras or other data recording devices, which limits the ability of an unauthorized client to view content from any one or all of the network data recording devices. Additionally, in a further embodiment, the invention maintains a record of the history of accesses or access attempts to a particular camera/data recording device.

In a further embodiment, the invention automatically alerts or notifies a registered client when either an alarm/sensor has been activated or a camera detects activity. Thus, the client is automatically notified when a sensor, either an external sensor or a motion sensor implemented within a camera, detects a pre-specified event, activity or phenomena (e.g., motion, light, temperature) and, thereafter, data from a data recording device (e.g., a camera) is made available to the client.

In another embodiment, the invention includes a privacy module. This module is able to detect if a camera has been moved from its original location and then sends a message to a predetermined client who is responsible for the administration of this camera or the network of cameras that the camera belongs to. Thus, the present invention utilizes several novel components to enable a client to securely access a network of analog or digital cameras, and/or other data recording devices, from a PC, laptop, PDA, mobile phone or custom networked computing device that has a general or application specific processor and a display. The invention further provides the capability of notifying one or more predetermined clients when an event, such as the triggering of an alarm or sensor, has occurred and, thereafter, providing visual and/or audio data to designated client devices, so that clients can view or listen to the data associated with the sensor-triggering event. Additionally, this invention provides a mechanism to insure that once a camera is installed, the administrator of that camera can be notified if it is moved or damaged. Furthermore, the system is also able to record any attempt, whether successful or not, to gain access to the system and particular cameras or other data recording devices on a network.

BRIEF DESCRIPTION OF THE DRAWINGS

FIG. 6 illustrates an exemplary mapping table in accordance with one embodiment of the invention.

DETAILED DESCRIPTION OF THE PREFERRED EMBODIMENTS

Figure 1:
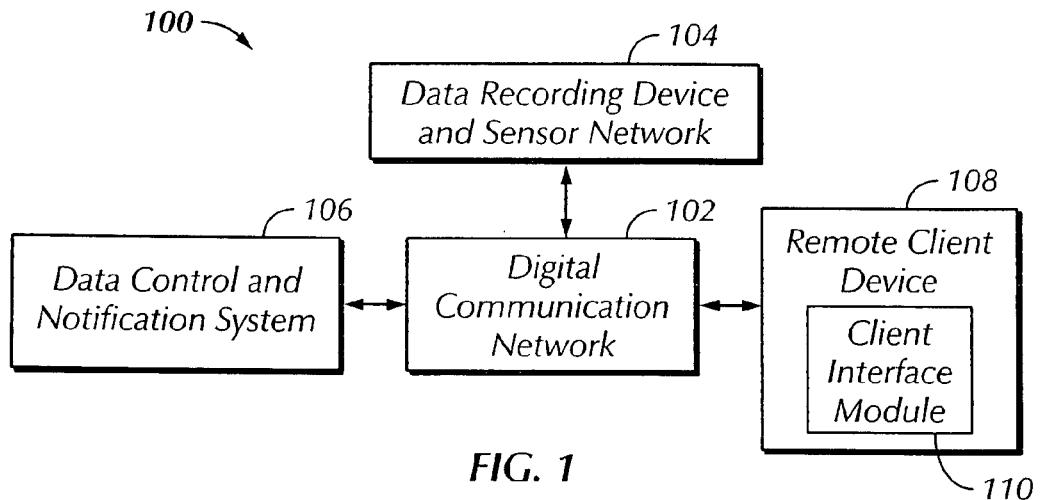
FIG. 1 illustrates a high level block diagram of a system 100, in accordance with one embodiment of the invention.

FIG. 1 illustrates a high level block diagram of a system 100 in accordance with one embodiment of the invention. As shown in FIG. 1, the system 100 includes a digital communications network 102, a data recording device and sensor network 104, coupled to the communications network 102, a data control and notification system 106, coupled to the communications network 102, and a remote client device 108, also coupled to the communications network 102. The remote client device 108 further includes a client interface module 110, which, in one embodiment is a software module/program executed by a microprocessor (not shown) within the remote client device 108 so as to enable the client device 108 to communicate with the data control and notification system 106 via the digital communications network 102.

The digital communications network 102 may be any one or combination of known communication networks such as local area networks (LAN), wide area networks (WAN), world wide web (www or "Internet"), synchronous optical networks (SONET), wireless networks (e.g., wireless LAN, CDMA or GSM), and landline networks or switches. Each of these types of networks utilize well known data and communication protocols that allow a plurality of digital data types and digital signals to be transmitted between two or more remote devices, systems and/or networks connected to the communication network 102. In one embodiment, the invention utilizes the Internet Protocol (IP) communication protocol and provides a client interface in the form of HTML web pages containing links and command icons selectable by the client. The client interface module 110 provides the necessary functionality to receive data, requests and commands and transmit data, requests and commands using the IP protocol. Many types of software for communicating with remote host or server computers via a digital communications network are known and commercially available, which may be utilized in the present invention. Additionally, those of ordinary skill in the art would be able to design and implement custom software, without undue experimentation, to achieve the functionalities of the invention described herein.

The remote data recording device and sensor network 104, the data control and notification system 106 and the remote client device 108 may be communicatively coupled to the digital communications network 102 in accordance with any known coupling and access technology, including but not limited to: phone dial-up, digital subscriber line (DSL), cable, T1 or wireless technologies (e.g., wireless LAN, CDMA and/or GSM).

As described in further detail below, the types of data that may be transmitted between the recording device network 104, the data control and notification system 106, and the remote client device 108 can include but is not limited to compressed audio, compressed video, still images (compressed or uncompressed), computer graphics, email, Short Messages (SMS), Instant Messages (IM), Multimedia Messages (MMS), authentication data, authorization data, and various commands for the purposes of performing the desired functions and/or services described herein.

Figure 2:
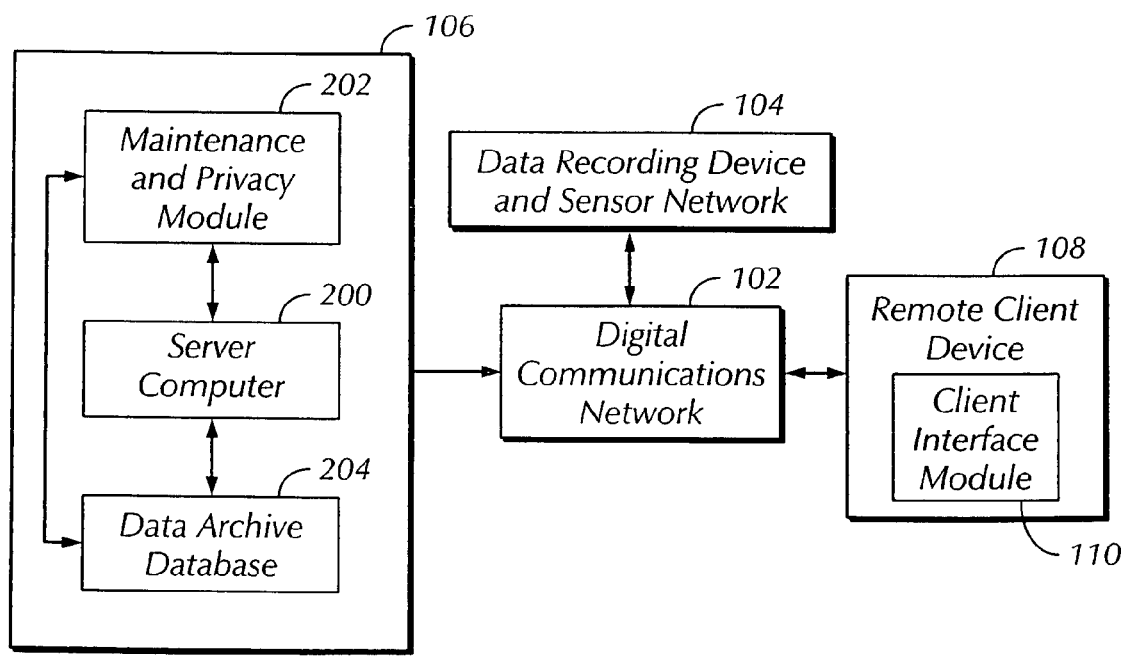
FIG. 2 illustrates a more detailed block diagram of the system 100 of FIG. 1, providing further details of the Data Control and Notification System 106, in accordance with one embodiment of the invention.

FIG. 2 illustrates a more detailed block diagram of the system 100, wherein one embodiment of the data control and notification system 106 of FIG. 1 is illustrated in further detail. In this embodiment, the data control and notification system 106 includes a server computer 200, which is coupled to the digital communications network 102. The server computer 200 may be a conventional type server computer which is well known in the art. The server 200 includes, for example, a processor chip (CPU), memory (e.g., HDD, RAM, ROM, cache), data buses, and necessary interfaces for receiving, transmitting and processing data, requests, commands from external devices, systems and networks (e.g., network 102).

The data control and notification system 106 further includes a maintenance and privacy module 106 for insuring that cameras, both analog and digital, are working properly and have not been tampered with or moved from their original location. The maintenance and privacy module 202 is coupled to the server computer 200. Upon set up and initiation of the data recording device and sensor network 104, which will be described in further detail below with reference to FIG. 3, a collection of data for each camera is collected and stored in the data archive database 204, which is also coupled to the server 200 and the maintenance and privacy module 202. The type of data collected and stored in the database 204 includes, but is not limited to a video reference frame, audio signatures, position information, and associated sensor values. Periodically through the day the maintenance and privacy module 202 signals to the server 200 to acquire from each camera a similar set of data as stored in its database. The maintenance and privacy module 202 then compares the data collected by the server 200 to what is stored in the database 204. If there is a noticeable change, the maintenance and privacy module 202 signals that to the server 200, which then sends a message to a system administrator and/or other predetermined clients that a problem has been detected with one or more cameras. The message also identifies which cameras for which there is a potential problem.

For purposes of illustration, the maintenance and privacy module 202 is depicted as a separate unit from the server computer 200. In one embodiment, it may be a separate unit having its own processing circuitry, memory, software and/or firmware which performs the function of monitoring for changes in the camera network as described above. However, in other embodiments, the maintenance and privacy module 202 may be a software module that is integrated into and executed by the server computer 200.

The database 204 may be a peripheral mass storage unit that is coupled to the server computer 200 and the maintenance and privacy module 202 or, alternatively, it may simply be the HDD of the server computer 200 if the memory requirements for particular applications or situations do not warrant a separate mass storage device. Alternatively, the database 204 may be integrated with a memory of the maintenance and privacy module 202, if the privacy module 202 is a separate module from the server computer 200.

Figure 3:
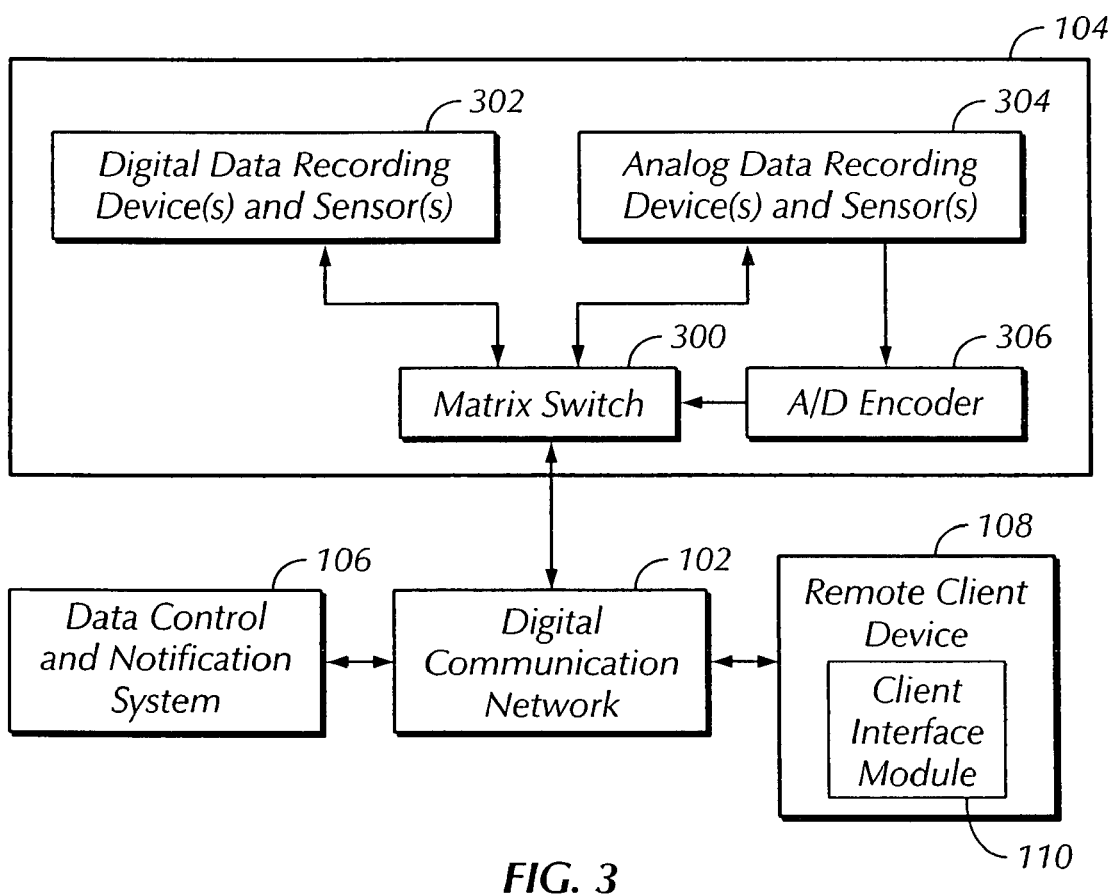
FIG. 3 illustrates a more detailed block diagram of the system 100 of FIG. 1, providing further details of the Data Recording Device & Sensor Network 104, in accordance with one embodiment of the invention.

FIG. 3 illustrates a further detailed block diagram of the system 100, wherein further details are provided for the data recording device and sensor network 104, in accordance with one embodiment of the invention. The data recording device and sensor network 104 includes a matrix switch 300, coupled to the digital communications network 102, for receiving an access request or address for one or more devices or sensors coupled to the matrix switch 300. Upon receiving an access request or address, the matrix switch 300 provides a communication link to the requested device(s) or sensor(s) such that communications between the requested device(s) or sensor(s) and the server computer 200 (FIG. 2) may occur via the digital communications network 102. Many types of matrix switches capable of performing digital switching, routing and multiplexing functions are known in the art and may be utilized in the present invention.

The network 104 also includes a digital sub-network 302 comprising at least one digital recording device (e.g., a digital video camera) and at least one sensor. The sensor may be a separate unit from the video camera or, in an alternative embodiment, may be integrated with the camera to sense motion and/or audio changes within a specified spatial region or range. Various types of sensors are well-known in the art such as motion, temperature, light, chemical, and pressure sensors, for example. These and other types of sensors known in the art may be utilized in the present invention. The digital data recording device(s) and sensor(s) are addressably coupled to the switch matrix 300 so that an individual device or sensor may be selectively accessed.

Optionally, the device and sensor network 104 also includes an analog sub-network 304 comprising at least one analog recording device (e.g., an analog video recorder) and at least one sensor. As discussed above, the sensor may be a separate unit from the video camera or, in an alternative embodiment, may be integrated with the camera to sense motion and/or audio changes within a specified spatial region or range.

Depending on which recording device or sensor the server 200 desires access to, the switch matrix 300 provides connectivity to the requested recording device or sensor in sub-network 302 or 304. If the requested recording device or sensor is an analog device located in analog sub-network 304, a communication link is established with the requested recording device or sensor. However, all analog data (e.g., an analog video feed) output from an analog device is first provided to an analog-to-digital (A/D) encoder 306, where it is digitally encoded and formatted in accordance with a predefined data format and communication protocol, before it is transmitted through the digital communication network 102 to the server computer 200.

It is understood by those skilled in the art that the foregoing is a relatively "high-level" discussion of the functionality provided by the invention. A detailed technical discussion of controller circuitry, switching logic, data and I/O busses, memory requirements (buffers, registers, etc.), multiplexers/demultiplexers, and other circuits and structures, which may be present in the matrix switch 300 and/or server 202, for example, is not provided herein. Such components and structures are well-known in the art and various implementations and different technical architectures may be designed by those skilled in the art, without undue experimentation, in order to accomplish the functions described herein.

A client can remotely access the data control and notification system 106 with his or her remote client device 108 via the communication network 102. The remote client device 108 may be a personal computer, personal digital assistant (PDA), palmtop computer, a cellular telephone, or other network computing device that has a general or application specific processor and a display. In each of these embodiments, the remote client device 108 includes a client interface software module 110 that is executed by processing circuitry (e.g., a microprocessor or CPU) within the device 108 to provide a client interface and allow the communication of data between the client device 108 and the data control and notification system 106, via the network 102.

In one embodiment, the data recording devices within the network 104 may include a camera that is equipped with a microphone, recording circuitry and memory for recording audio information as well as video information. A client wishing to access the video and audio content from a particular camera must first be authenticated as a valid client by the data control and authentication system 106. The server computer 200 of the data control and authentication system 106 provides to the remote client device 108 a web page that prompts the client to enter his or her unique username and password. The client interface module 110 executed by the client device 108 allows the client device 108 to receive the web page from the server 200 in a predefined format (e.g., HTML) and further allows the client device 108 to communicate with the server 200 in accordance with a predefined protocol and data format. After the client enters his or her unique username and password, this information is securely transmitted to the server 200 and verified by comparing the received information to client verification data stored in the data archive database 204. In one embodiment, this database may be a hard disk drive (HDD) within the server 200. However, if greater storage capacity is required additional or alternate external memory may be coupled to the server 200 for access by the server 200 as necessary.

In one embodiment, if the username and password are verified, the server 200 and client device 108 perform an additional exchange of information. At the time of setup, each client device 108 is given a unique, nontransferable identification number. This number is stored in the database 204 and associated with a client's username and password. After a client has successfully entered his or her unique username and password the client interface module 110 within the client device 108 initiates transmission of the unique, nontransferable number to the server 200. The server 200 verifies, by comparing database entries, that the unique nontransferable number and the client name and password are associated with each other. For clients with mobile phones installed with the client interface module 110, the International Mobile Equipment Identity (IMEI) identification number can be used as the unique nontransferable identification number. The IMEI number of mobile phones is well known in the art. For other devices, such as PDAs and PCs, in one embodiment, a random number may be generated at setup and loaded via a secure application into the device. Thereafter, that is the unique nontransferable identification number that is associated with the device and thereafter used by that device. The client interface module 110 automatically stores the identification number for future use. In a further embodiment, the server 200 maintains a record of access requests and any attempt by a client to login, whether successful or not, is noted and logged for future analysis as may be desired.

Once a client is successfully logged in and authorized, the server 200 provides a client webpage to that client with active links to cameras or other data recording devices that the client is authorized to view. This page is dynamically created and served at the time of authentication and authorization, since not all clients will be authorized to view all cameras or the same cameras as other clients. The database 204 (e.g., HDD or external memory storage) contains information identifying which data recording devices a client is authorized to access. The database 204 is checked by the server 200 at the time a client is authenticated. In one embodiment, access to this database is password protected and can only be updated by a system administrator. Once a client chooses which data recording device he or she would like to receive content from, by selecting on the corresponding link, the server 200 transmits the requested data to the client device 108. In one embodiment, video and/or audio data is transmitted, utilizing well known video and audio data compression and streaming techniques, via the digital communications network 102.

If a client is authorized, the server 200 can also provide the option of viewing archived content from pre-specified cameras, or other data recording devices, stored in the data archive database 204. In one embodiment, the server can execute instructions or requests to store content from specified data recording devices at specified times and for specified durations. This archived content can then later be retrieved for viewing by authorized clients. In one embodiment, this content is stored in a compressed format and transmitted to the client in a compressed format whereupon, after receiving the content, the client interface module 110 decompresses the content and provides it to the client device 108 for viewing and/or listening by the client.

In one embodiment, the server 200 executes a program that periodically, continuously, or at specified times, monitors some or all of the sensors within the sensor network 104 to determine if any sensors have been triggered or activated. In other embodiments, the sensors may have active circuitry associated with them to send a signal to the server 200 when they have been triggered. In one embodiment, when a sensor is triggered, the server 200 notifies a pre-specified client, associated with the triggered sensor, by sending a signal or message to that client's device 108. At the time of setup of a client account, alarm notification rules are established and stored by the server 200. For example, a client can specify that if a motion sensor is triggered in his or her warehouse between the hours of 9:00 pm and 6:00 am, the server 200 should send a notification alert to one or more designated client devices 108. In one embodiment, these notification rules are password protected and can only be updated by a system administrator and/or authorized client. A sensor can be triggered for many reasons, such as, but not limited to motion, heat and sound. Once triggered, the server 200 determines by database lookup which camera or other data recording device is associated with the triggered sensor and transmits to the pre-specified client device(s) 108 a message that informs the client a sensor has been triggered in accordance with the notification rules specified by the client. In one embodiment, the server also transmits an active link (e.g., URL) to the data recording device so that the client can access live or real-time streaming data (video and/or audio) from the recording device. Upon receiving this message, the client can activate the link and actually see and/or hear what is going on in the warehouse, for example.

Figure 4:
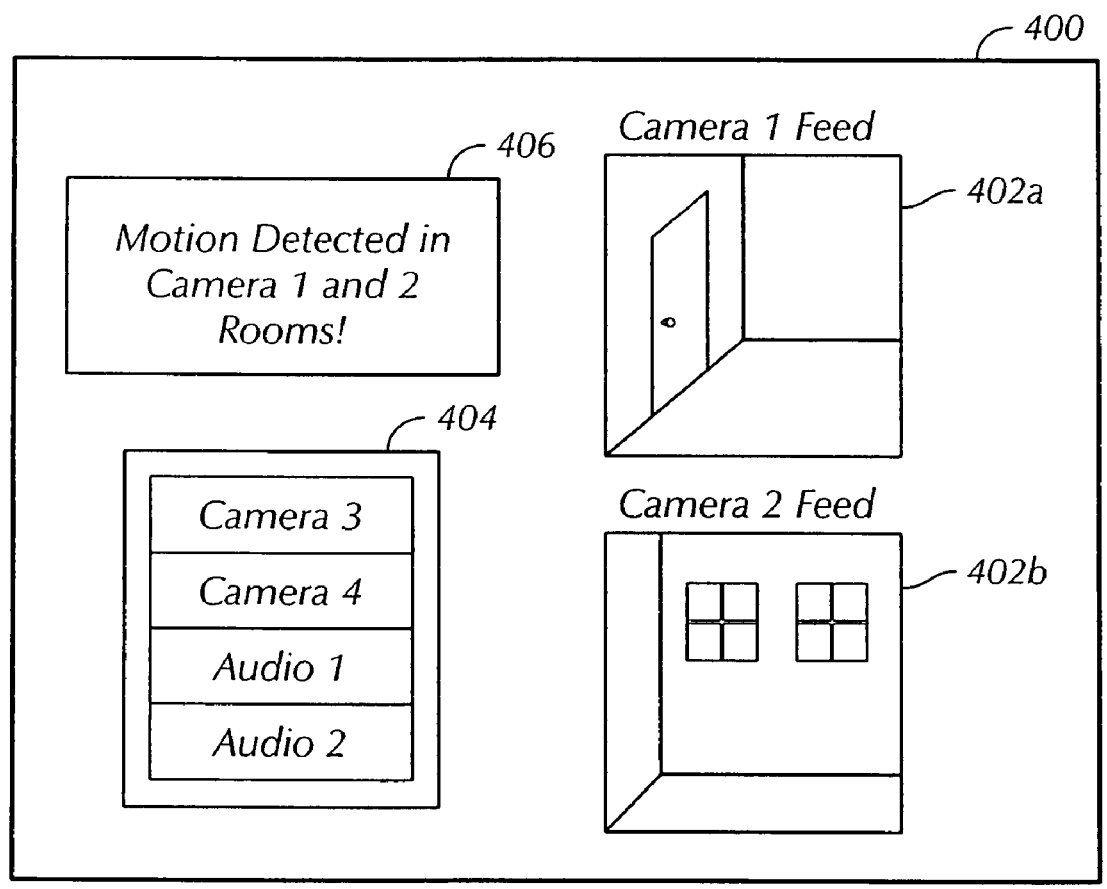
FIG. 4 illustrates an exemplary graphic display that may be provided on a display screen of a client device, in accordance with one embodiment of the invention.

FIG. 4 illustrates an exemplary dynamically-generated web page 400 that is provided to a display on the client device 108. The web page 400 can include one or more video feed windows 402 which display real-time video data from designated cameras associated with the authenticated client. In the example illustrated in FIG. 4, cameras 1 and 2 are providing video feeds which are displayed in windows 402*a* and 402*b*, respectively. In one embodiment, the client can set default cameras from which the video feed would be automatically provided in the windows 402 in his or her custom web page 400. The web page 400 further includes active links 404 that are selectable by the client in order to view or receive data from other data recording devices (e.g., camera 3, camera 4, audio recording device 1, audio recording device 2) for which the client is authorized. As also shown in FIG. 4, an exemplary message 406 informs the client that a sensor has detected motion in the rooms where cameras 1 and 2 are located.

In one embodiment, the remote client device 108 is a cellular telephone which is enabled to receive data via a communications network (e.g., the Internet) and receive compressed video and/or audio data. Upon receiving the compressed video and/or audio data, the phone is equipped with appropriate decompression and decoding circuitry to provide the decompressed video, and/or still images, and/or audio content to the client. Upon detection of a sensor triggering event, the server 200 initiates a call to, or pages, the cellular telephone, by looking up a corresponding telephone/pager number stored in the database 204, to notify the client of the sensor triggering event.

Figure 5:
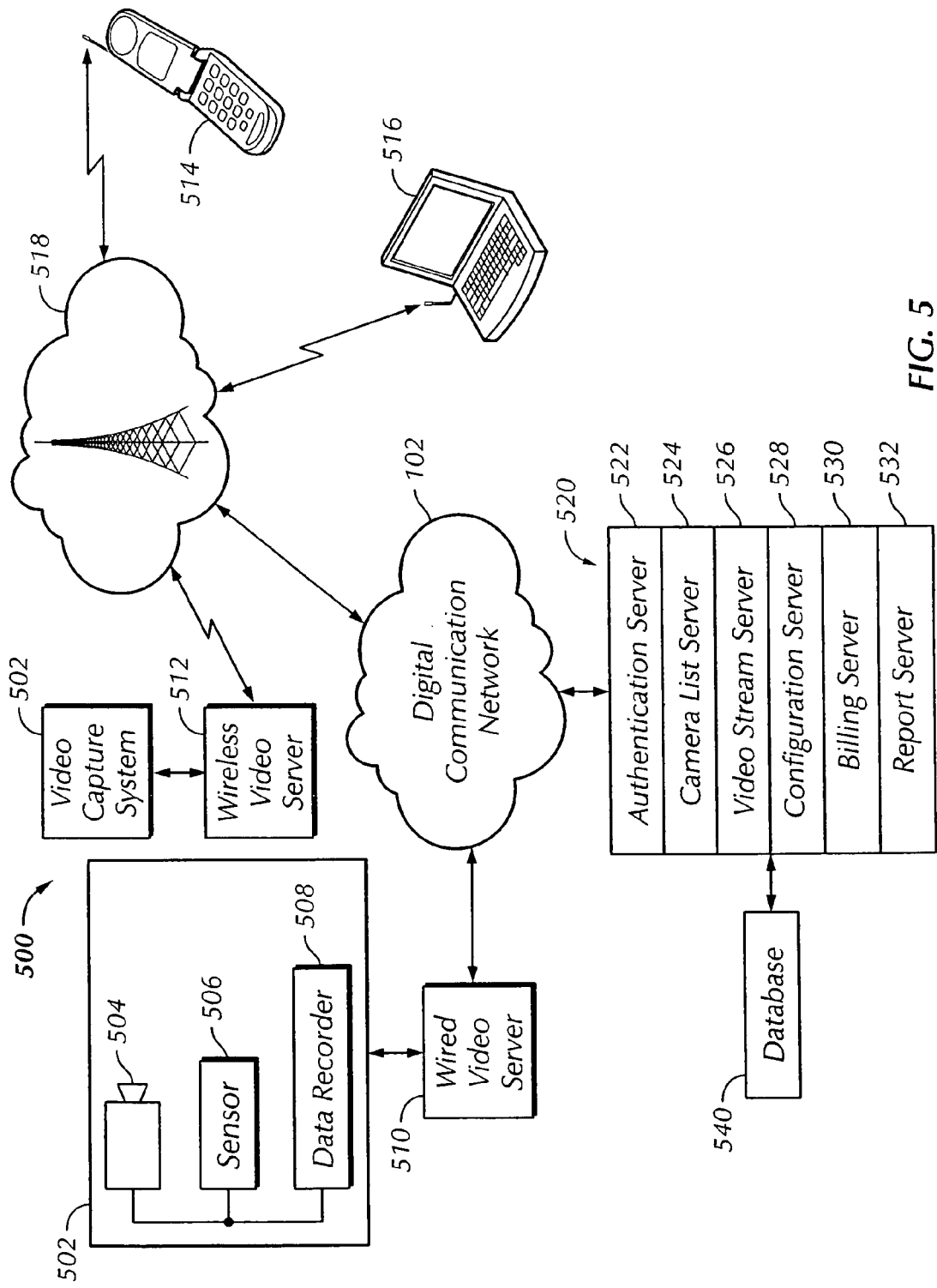
FIG. 5 illustrates a high-level system diagram in accordance with a further embodiment of the invention.

FIG. 5 illustrates a high-level diagram of a communication systems network 500, in accordance with one embodiment of the invention. Video data is captured by a video capture system 502. In one embodiment, the video capture system 502 includes at least one video camera 504, at least one sensor 506 (e.g., motion detector, light, pressure, temperature or chemical sensor, etc.) and at least one data recorder 508. The data recorder (e.g., a digital video recorder) can receive and store analog and/or digital video and audio (optional) signals from one or more video cameras 504. Upon triggering of a sensor 506 associated with a particular video camera 504, as discussed above, recorded data from the video camera 504 is transmitted by the data recorder 508 to a "wired" video server 510. The "wired" video server 510 is so named because it communicates with the digital communication network 102 via traditional landline communication links and protocols (e.g., Ethernet, T1, fiber optics, etc.).

In further embodiments, the communications network 500 includes one or more "wireless" video servers 512, which receives analog signals or digital data from a video capture system 502 and transmits requested/appropriate digital data to one or more wireless client devices such as a cell phone 514 or wireless laptop computer 516, via a radio frequency (RF) wireless communication network 518. The wireless communication network 518 can be, for example, a wireless network owned and operated by AT&T, Verizon Wireless, T-Mobile, etc. utilizing any of the known wireless communication protocols (e.g., CDMA, GSM, TDMA, etc.)

Handshaking protocols and authentication procedures performed prior to transmission of data from video servers 510 and/or 512 to one or more remote client devices 514 and/or 516, in accordance with various embodiments of the invention, are described in further detail below. Although each type of server 510 and 512 may receive and store data in a digital and/or analog format, in a preferred embodiment, all data is transmitted from the servers 510 and 512 in a digital format. Thus, if configured to receive information in an analog format, the video servers 510 and 512 incorporate analog-to-digital (A/D) converters for converting the received analog signals into a digital format prior to transmission through the digital communications network 102 and/or wireless communication network 518.

As shown in FIG. 5, a central bank of one or more servers 520 (hereinafter referred to as central servers 520) is also coupled to the digital communications network 102. In further embodiments, the central servers 520 may also be communicatively coupled directly with the wireless communication network 518 using well known wireless communication techniques and protocols. In one embodiment, the central servers 520 comprise a plurality of servers which each serve a specific function. However, it is understood that in alternative embodiments, the functionality of two or more servers may be incorporated within a single server and the number of functions executed by a single server depends on the amount of data that needs to be processed and performance characteristics of a particular server. The functionality of each of these servers or software modules is described in further detail below.

The bank of servers 520 includes an Authentication server or module 522, a Camera List server or module 524, a Video Streaming server or module 526, a Billing server or module 528, a Configuration server or module 530 and a Report server 532. Communicatively coupled to the central servers 520 is a database 540 for storing information used by one or more of the servers or modules 522-532.

The Authentication server 522 stores and checks a mapping table that correlates which remote client devices are authorized to communicate with particular video servers and vice versa. This mapping table may be stored in a memory (e.g., hard disk drive) of the Authentication server 522 and/or stored in the database 540 which is accessible by the Authentication server 522. In order to confirm the identity of (i.e., "authenticate") a particular remote client device 514 or a video server 510, for example, the Authentication server 522 executes an authentication algorithm wherein a number of inputs are "plugged into" a mathematical formula in order to calculate an "answer" and generate an "authentication ticket." The inputs to the mathematical formula include a secret code plus one or more shared parameters transmitted with the authentication ticket such as: IMEI, SIMM card identification no., manufacturer serial no., a randomly generated number, a time stamp, or any other desired code or parameter value. By inputting one or more parameter values as well as the secret code corresponding to a particular network device (e.g., a wireless phone 514, video server 510, etc.) into an arbitrary but predefined formula, the Authentication server 522 will calculate an "answer" and generate an electronic "authentication ticket" that contains at least the "answer" and one or more shared parameter values (e.g., any one of the above parameter values except the secret code).

The secret code corresponding to a particular network device is a code or value known only by that particular network device and the Authentication server 522, or bank of servers 520. The secret code is stored in a memory contained within the network device. The secret code is also stored in a memory associated with the Authentication server 522 and/or the database 540 and correlated with additional stored identification information for the particular network device (e.g., IMEI, mfr. serial no., IP address, etc.). As used herein the term "network device" generally refers to any remote client device or a video server communicatively coupled to the network 500, as described above.

In order to authenticate a communication session with a particular network device, the Authentication server 522 will send an authentication ticket to that device. The authentication ticket contains the calculated answer and other data or values, but not the secret code for the device. In this way, hackers who intercept communications with a network device can never access the secret code, which may jeopardize the integrity of the authentication procedure. When the network device receives the authentication ticket it calculates its own "answer" using the same formula used by the Authentication server 524 and the same secret code and other parameter values (e.g., IMEI, mfr. serial no., time stamp, random string) that were used by the Authentication server 524. The secret code is stored in the memory of the network device and some or all of the other parameter values may be contained in the authentication ticket and/or stored in the memory of the network device. Thereafter, the answer calculated by the network device is compared with the answer calculated by the Authentication server 524. If the answers match, then communications between the network device and the Authentication server 524 are authenticated and a communications link is established.

Conversely, if a network device (e.g., a wireless phone 514 or video server 510) initiates communications with the central servers 520, the network device will first generate an authentication ticket, as described above, and transmit the ticket to the Authentication server 522. The Authentication server 522 then calculates its own answer based on the shared parameter values contained in the ticket and the secret code corresponding to that particular network device. If the answer calculated by the Authentication server 522 matches the answer contained in the ticket, the network device is authenticated and a communications link is established between the network device and the central servers 520.

Thus, as described above, in one embodiment, a two-way authentication procedure and protocol may be implemented between network devices and the central servers 520. A network device authenticates itself to the central servers 520 and the central servers 520 authenticate themselves to the network device prior to establishment of a communication link and exchange of sensitive or confidential data. In this fashion a high degree of security is implemented and maintained. Additionally, as described in further detail below, the Authentication server 522 facilitates authentication between two or more network devices so that the network devices may communicate directly with one another in a secure fashion.

It is appreciated that the number and frequency of authentications between network devices and/or between a network device and the central servers 520 may be adjusted in accordance with a desired level of security and robustness against hackers or imposter devices. For example, a one-way authentication procedure may be implemented between a network device and the central servers 520 such that only the network device generates an authentication ticket which is then authenticated by the Authentication server 522, as described above. Subsequently, the communication link allows a free exchange of data and commands between the network device and the central servers 520 until the communication link is terminated (e.g., the caller hangs up). Conversely, if increased security is desired, it is possible to require an authentication ticket to be generated each time data/instructions are transmitted from one device/server to another device/server. Thus, the degree of security is adjustable and may be configured as desired by a system administrator to achieve desired security protocols. It is further appreciated that the authentication procedure and the use of a unique secret code for each network device, prevents imposter network devices from infiltrating the network and receiving sensitive and/or confidential information or causing disruption to authentic network devices, which are attempting to communicate with one another.

The Camera List server 524 maintains and generates a list of camera links that are correlated with one or more remote client devices (e.g., wireless phone 514) based on how a particular user or company has set up the rules and permissions for a particular account. In a further embodiment, the Camera List server 524 receives status information from one or more video servers 510, 512 and maintains a list of static IP addresses or current dynamic IP addresses for each server 510, 512. In one embodiment, it periodically receives updated information regarding a plurality of video servers 510, 512 coupled to the network 500 from a Report server or module 532. The Report server 532, which periodically communicates directly with each video server 510, 512, is discussed in further detail below.

In one embodiment, the information received and utilized by the Camera List server 524 is stored in the database 540. In one embodiment, when a remote client device 514, for example, requests access to one or more video feeds from one or more cameras 504, the Camera List server 524 generates a camera links file that contains links to each video feed that the remote client device 514 is authorized to receive. This list of video feeds or links that the client device 514 is authorized to view is maintained in a mapping table stored in the database 540. In one embodiment, in addition to containing the corresponding links to video feeds for the client device 14, the camera links file contains additional information such as transmission rates (e.g., bits/sec) and IP addresses for each link. After the client device 514 has successfully authenticated itself as described above, the Camera List server 524 will send the camera list file to the client device 514. Upon receiving the camera list file, an application program or module residing within the client device 514 will open the camera list file. In one embodiment, the camera list file will create a web page on a display of the client device 514 similar to that shown in FIG. 4. At this point, the client can select a particular link he or she wishes to view and thereafter receive streaming video from the video feed associated with that link.

In a further embodiment, before the Camera List Server 524 sends the camera list file to the client device 514, an authentication procedure is implemented between the Camera List Server 524 and the remote client device. This authentication procedure may be similar to the one-way or two-way authentication procedures described above with respect to the Authentication Server 522. In one-way authentication, the client device 514 generates an authentication ticket and sends it to the Camera List Server 524 for verification. In two-way authentication, both the client device 514 and the Camera List Server 524 generate an authentication ticket using the secret code corresponding to the client device 514. Each authentication ticket is transmitted to the other device/server for verification. It is appreciated that an authentication procedure implemented by the Camera List Server 524 provides further security against theft of the camera list file associated with each remote client device 514.

In one embodiment, each authentication ticket includes a time stamp value and expires after a predetermined time measured from the time stamp value. Therefore, a system designer can set the expiration time to a desired time period (e.g., 5 minutes) after which the authentication ticket will no longer be valid. In a further embodiment, an authentication ticket may be used only once. For example, once an authentication ticket generated by the client device 514 has been authenticated by the Camera List server 524, it cannot be used again to authenticate the client device 514 again at a later time. The Camera List server 524 will store the authentication ticket for a predetermined time period. If an identical authentication ticket is transmitted to the Camera List Server 524 five minutes later from a hacker who intercepted the first authentication ticket, for example, the Camera List Server 524 will note this is a previously used authentication ticket and void the ticket. In one embodiment, the authentication tickets generated by all network devices and central servers or modules 520 include a time stamp as a parameter value, expire after a predetermined time period, and can only be used once for authentication purposes.

In a further embodiment, information transmitted from the Camera List server 524 to remote client devices 514, 516, or between any two network devices or servers for that matter, is encrypted and decrypted using known encryption/decryption techniques. In this way, hackers that successfully intercept a communication stream will not be able to ascertain the content of the communication.

The Video Streaming Server 526 receives video stream data from one or more video servers 510, 512 and thereafter streams that video to one or more designated remote client devices 514, 516. In one embodiment, selected video stream data is received from the video server 510, for example, in a compressed and encrypted format using known compression and encryption techniques. The video stream data is then sent to one or more authorized remote client devices using the same or another appropriate compression and encryption algorithms. Authorized client devices 514, 516 are installed with appropriate decompression and decryption software to enable accurate recapture of the original video stream. In alternative embodiments, as described in further detail below, the video servers 510, 512 may transmit compressed and encrypted video streams directly to the remote client devices 514, 516. In these embodiments, the Authentication Server 522 enables the video server 510, 512 to be authenticated directly by the client devices and enables the client devices 514, 516 to be authenticated directly by the video servers 510, 512, allowing for secure communication links directly between the video servers 510, 512 and the client devices 514, 516. Preferred embodiments of this direct authentication process between two network devices is described in further detail below.

The Video Streaming Server 526 transmits video streams to remote client devices 514, 516, in accordance with known techniques and protocols. Alternatively or additionally, the video servers 510, 512 can directly transmit video streams to the remote client devices 514, 516 in accordance with such known techniques, as long as appropriate authentication procedures are performed to allow such direct streaming in a secure manner. Such authentication procedures are described in further detail below.

The Configuration Server 528 maintains and keeps track of which client devices 514, 516 can access which video servers 510, 512 and updates these rules when warranted. In one embodiment, these rules are contained in a mapping table 600 described in further detail below. For example, a client may decide to change the rules pertaining to its network devices and re-specify the triggering events or which devices are authorized for certain cameras. Additionally, if a client device (e.g., cell phone) is lost or stolen, the Configuration Server 528 processes the report indicating that the device is lost or stolen and disables all access for that client device. In one embodiment, the Configuration Server keeps of track of new network devices that have been registered with a particular vendor or distributor and updates configuration information associated with that vendor or distributor. The Configuration Server 528 further maintains information such as the geographic location of some or all network devices, the names of individuals who should be contacted and their contact information if a network device is malfunctioning, damaged or destroyed, and other desired administration information.

The Billing Server 530 maintains and updates financial account information for each customer that owns or uses one or more network devices 510, 512, 514 and/or 516 and keeps track of outstanding customer invoices, amounts owed, amounts paid, expiration of registration, etc. In one embodiment, the Billing Server 530 further allows each customer to make payments, change account or services type, or renew registration or membership for services. Various online financial and transactional systems and methods are known in the art and can be modified and utilized in accordance with the present invention by those skilled in the art without undue experimentation.

The Report Server 532 determines whether any of the video servers 510, cameras 504, sensors 506 and/or data recorders 508 are not functioning properly. By monitoring and receiving periodic signals from some or all of these types of devices within the network 500, the Report server 532 determines the identity and location of malfunctioning subsystems and/or devices in the overall network 500. In situations, where there are multitudes of devices in the network 500 or a system connected to the network, this monitoring capability allows easy and early detection of problem subsystems and devices. In one embodiment, the Report Server 532 periodically updates the Camera List Server 524 with information pertaining to the status, current dynamic IP addresses, etc. of the video servers 510, 512 and video capture systems 502 coupled to the network 500. The Camera List Server 524 then modifies the mapping table accordingly to reflect the most updated information concerning each server, system and subsystems.

In one embodiment, in order to determine which client devices 514, 516 are authorized to receive video data from particular cameras 504, or to be notified when particular sensors 506 are triggered or events take place, a mapping table 600 is stored in the database 540. An exemplary mapping table 600 is illustrated in FIG. 6 in accordance with one embodiment of the present invention. The mapping table can be in the format of a relational database structure which maps the correlation between remote client devices, video servers, cameras, sensors, triggering events, etc. As shown in FIG. 6, the mapping table includes a list of registered remote client devices 602, identification information for each client device such as, for example, IMEI numbers 604 and/or manufacturer serial numbers 606, a list of video servers 608 that may be accessed by each client device, a list of cameras 610 that may be accessed by each client device, a list of rules 612 corresponding to each client device, a secret code 614 corresponding to each client device and a registration key or code 616 corresponding to that device. It is appreciated that the parameters/entries shown in table 600 are exemplary and does not necessarily constitute an exhaustive or exclusive list. Other parameters/entries may be added or substituted for those shown in table 600 in accordance with the specific requirements of a particular system or network protocol.

The list of rules 612 will specify the circumstances under which each client device is to be notified or is authorized to receive data from particular cameras. For example, the rules corresponding to a first client device (0000001) may specify that this client device should be notified whenever sensor 5 is triggered. The rules may further specify that this client device is authorized to view video feeds from cameras 1, 3 and 5 at any time. Of course, more than one client device may be designated for notification when a particular sensor (e.g., sensor 5) is triggered. The mapping table 600 enables identification of all the client devices correlated to a specific triggering event or authorized to view a specific camera, etc. In one embodiment, the mapping table 600 is provided in a relational database structure and can identify all the correlations and cross-correlations between the various entries in the mapping table 600. It is appreciated by those of skill in the art that the mapping table 600 may consist of multiple tables containing various parameter values which are cross-correlated with one another in a relational format. Such relational memory structures and database formats are well known in the art.

As further shown in FIG. 6, each client device is assigned a registration key 616. In one embodiment, the proprietary software installed on each network device, which enables the functionality described herein, requires a registration key that expires after a predefined period (e.g., 1 year). This registration key is obtained from a distributor (e.g., Perseus Wireless) and contains a jumbled and/or encrypted combination of, for example, expiration date, IMEI, SIM card data, and a distributor code that identifies a particular vendor or distributor of the network device. Each software program installed on a network device is registered by the distributor who sold and installed the software on the device. In this way, the method and system of the invention can keep track of which network devices are assigned to, or sold by, a particular distributor or vendor. This will also allow distributors and vendors to control and track the status of network devices sold by them and prevent unauthorized devices (e.g., a device sold by another vendor) from being added to the network and communicating with authorized devices that are part of that vendor's or distributor's network of devices.

Figure 7:
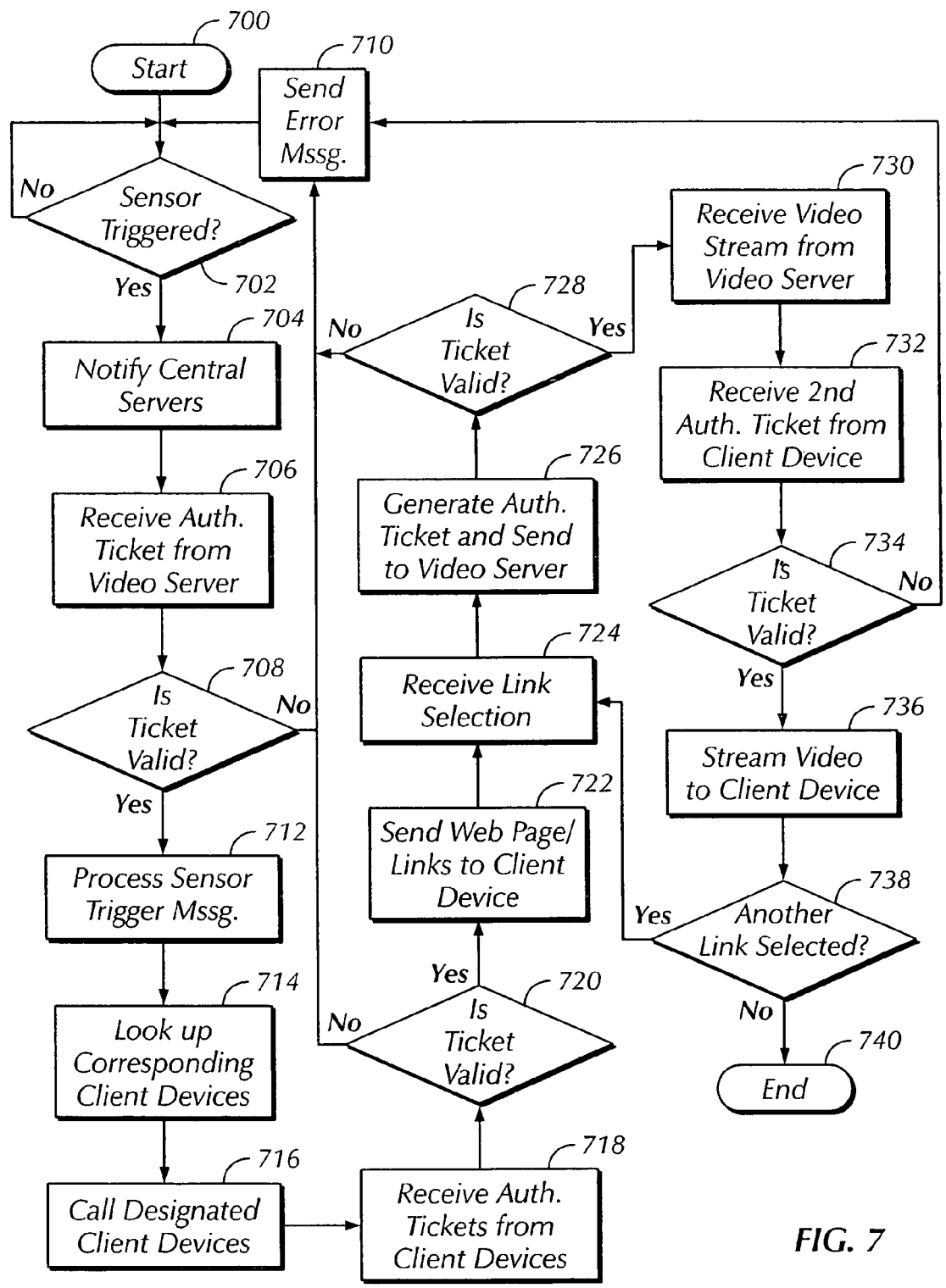
FIG. 7 illustrates a high-level flowchart of a process of streaming video from a video server to a remote client device, initiated by a trigger event, and an authentication procedure associated therewith, in accordance with one embodiment of the invention.

FIG. 7 illustrates a high-level flow chart of a process of streaming video from a video server to a remote client device and an authentication procedure implementing prior to streaming, in accordance with one embodiment of the invention. For purposes of illustration and ease of discussion, the process steps in FIG. 7 are described below with reference to the devices and servers illustrated in FIG. 5.

The process starts at step 700 and proceeds to step 702 wherein the data recorder 508 or video server 510 determines whether a sensor 506 has been triggered. If yes, at step 704, either the data recorder 508 (if it is equipped with appropriate software and hardware for network communications) or the video server 510 notifies the central servers 520. This intelligence and functionality for determining whether sensor 506 has been triggered and subsequently reporting the triggering event can be assigned to either the data recorder 508 or the video server 510 as desired by a system designer. At step 706, the Authentication Server 522 receives an authentication ticket from the video server 510. At step 708, the Authentication server 522 then calculates its own answer using the secret code corresponding to the video server 510 and parameter values stored on the authentication ticket. If the answers do not match, then authentication has failed and the process proceeds to step 710 where a failed authentication or error message is transmitted to the video server 510 and process resumes at step 702.

If the answer calculated by the Authentication server 522 matches the answer contained in the authentication ticket, the authenticity of the video server 510 is confirmed and, at step 712, the Authentication Server 522 receives and processes the message that sensor 506 has been triggered. At step 714, the Authentication server 522 checks the mapping table 600 and determines which remote client devices (e.g., 514 and/or 516) must be notified of the triggering event in accordance with the rules and/or instructions corresponding to the sensor 506 triggering event. Such rules and/or instructions are reflected in the mapping table, which is stored in the database 540, for example.

If the remote client device 514, for example, is designated as a device to be notified, at step 716, the Authentication server 522 sends a message or performs a "data call" to the remote client device 514. In one embodiment, if the client device 514 is a wireless cell phone or PDA, a unique ringer tone and/or vibration may be implemented in the client device 514 to indicate the nature of the call (e.g., a data call vs. voice call), the triggering of a particular sensor 506 and/or otherwise differentiate it from normal voice calls. In one embodiment, after authentication of the video server 510, the Authentication Server 522 receives a still image or short video (e.g., 15 seconds) from the video server 510 and, thereafter, sends this image or short video file directly to the client device 514 whereupon the client device will provide or play the video image(s) on its display screen, after the user has "answered" the call. This technique of "pushing" a graphic image or a short video from the video server 510 to the client device 514 may be performed in accordance with known multi-media message (MMS) technologies and protocols. It is appreciated that such a technique of notifying a client of a particular triggering event will impress upon the client the urgency of the event or at least clearly distinguish the notification from a typical voice call that is received on the client device 514. It is further appreciated that appropriate software and/or firmware is installed in and executed by the video server 510, the Authentication server 522 and the client device 514 to enable them to perform the functions and authentication procedures described herein.

At step 718, the Authentication Server 720 receives an authentication ticket from the client device 514 before allowing any further access to video data. At step 720, the Authentication Server 522 determines if the ticket is valid. If not valid, the process proceeds to step 710 as previously discussed. If the ticket is valid, then at step 722, the Camera List Server 524, which receives instructions from the Authentication Server 522, sends a camera list file to the client device 514. As described above, when opened by a "player" software module installed in the client device 514, the camera list file provides a web page and links to authorized video feeds and displays them on a display of the client device 514. An exemplary web page and exemplary links are illustrated in FIG. 4. In one embodiment, after completion of an authentication procedure, the Video Stream Server 526 can stream video data to the client device 514 from a pre-designated digital data recording device (e.g., data recorder 508) or digital-communications-enabled camera (e.g., camera 504), corresponding to the triggered sensor 506, without sending a camera list file to the remote client device 514. In another embodiment, the remote client device 514 can be directly connected to an appropriate camera 504/data recording device 508 to view live and/or archived video data. Alternatively, using the web page and links provided by the camera list file, a client can select a link to view a video stream corresponding to that link. At step 724, the Authentication Server 522 receives a link selection transmitted by the client device 514. At step 726, the Video Stream Server 526 generates an authentication ticket using the secret code assigned to the video server 510 and transmits the ticket to the video server 510. At step 728, the video server 510 determines if the authentication ticket is valid by calculating its own answer and comparing it with the answer provided by the ticket. If the answers match, the video server 510 determines that the Video Stream Server 526 is genuine and, at step 730, the Video Stream Server 526 receives the requested video stream data from the video server 510. If the authentication ticket is not authenticated, the video server 510 sends an error message to the Video Stream Server 526 (step 710).

After receiving video streaming data from the video server 510 but before forwarding the video streaming data to the client device 514, the Video Stream Server 526, at step 732, requests an authentication ticket from the client device 514. At step 734, the Video Stream Server 526 receives and determines whether the authentication ticket is valid. If no, the process proceeds to step 710 where an error message is sent to the client device 514. If yes, at step 736, the Video Stream Server 526 will begin streaming video to the client device 514. In one embodiment, all transmissions of streaming video from one device/server to another utilize known compression/decompression and encryption/decryption techniques. In a further embodiment, the above-described authentication steps are transparent to the client or end-user.

After the video transmission to the client device 514 is completed, at step 738, the Video Stream Server 526 determines whether another link has been selected by the client. If yes, the process returns to step 728 wherein the above described steps 728 et seq. are repeated. If no further links are selected by the client, the process terminates at step 740.

In a further embodiment, the Video Stream Server 524, or other designated server, can further provide an action item list corresponding to the triggered sensor and, thereafter, keep track of who performed such action items in accordance with a handling protocol established by the client. For example, in response to a sensor indicating a possible fire at a client's warehouse, the Video Stream Server 524 after providing video stream data to a client device 514, for example, can provide an action item list or protocol to the client device 514. Such an action item list can include a list of personnel to notify about the event, telephone numbers for pertinent emergency personnel (e.g., local fire department), and other action items that are configurable in advance by the client. Since the method and system of the present invention can keep track of which client devices are notified, in one embodiment, it also keeps track of what action items were performed by particular individuals and when they were performed. In a further embodiment, an action item check list is provided to at least one client device so that a client can "check off" each action item as they are performed and the system maintains a record of the status of the action items. In a further embodiment, the method and system of the invention transmits pre-designated hyperlinks to initiate certain actions (e.g., call police, fire dept., etc.) so that a client can easily perform desired action items by simply clicking on the hyperlinks.

Figure 8:
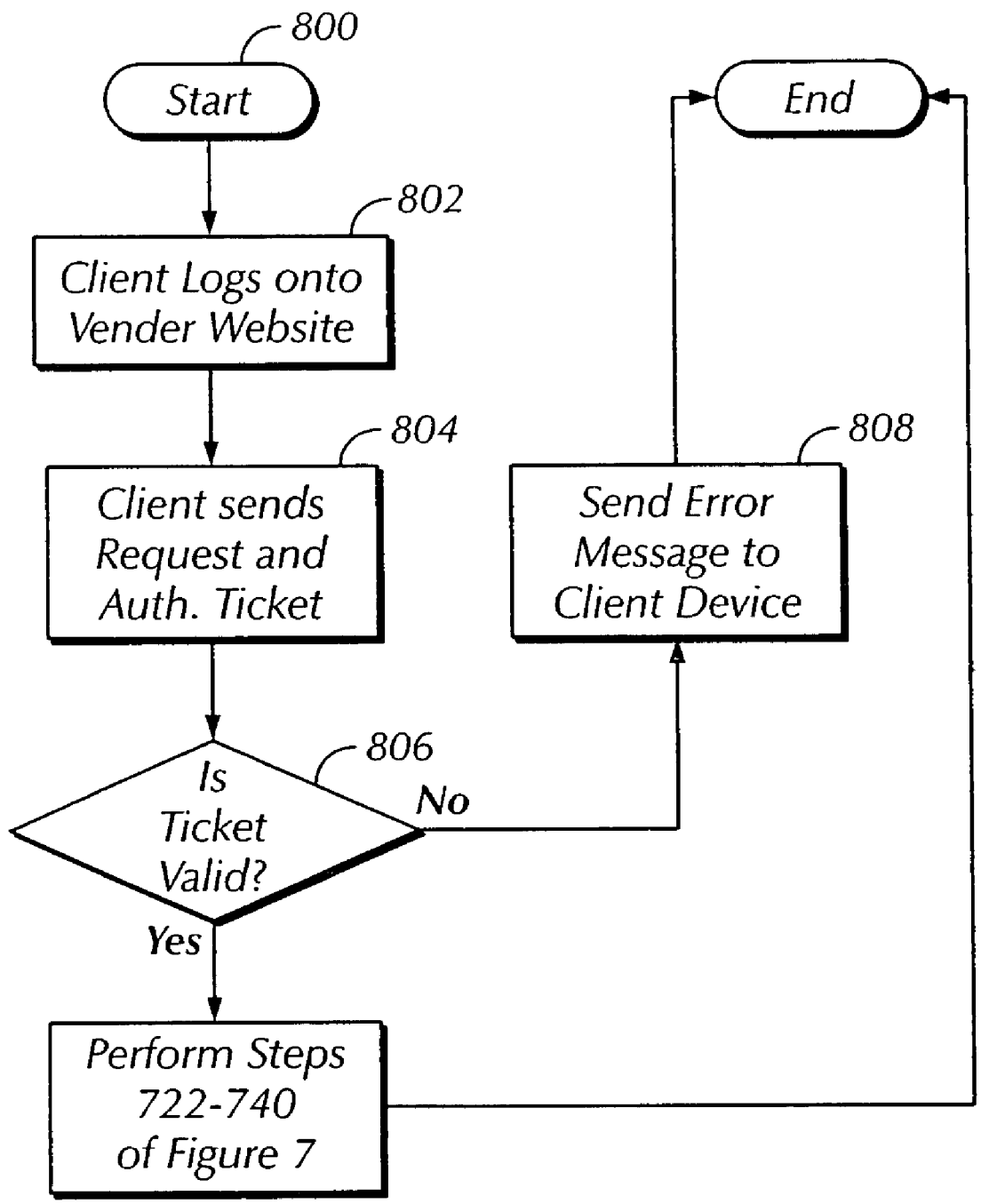
FIG. 8 illustrates a high-level flowchart of a process of streaming video from a video server when requested by a remote client device, and an authentication procedure associated therewith, in accordance with one embodiment of the invention.

FIG. 8 illustrate a high level flowchart diagram of a process of transmitting streaming video data to a remote client device, wherein the client device initiates the request, and an exemplary authentication associated therewith, in accordance with one embodiment of the invention. The process starts at step 800 and proceeds to step 802 wherein a client, via a client device 514, for example, accesses a vendor website (e.g., perseuswireless.com) and successfully logs on using or her username and password. At step 804, the client requests to view authorized video stream data by selecting appropriate command icons or links provided on a user interface displayed on the client device 514. When such a request is made, the client device 514 also automatically generates and sends an authentication ticket to the Authentication Server 522. At step 806, the Authentication Server 522 determines if the authentication ticket is valid, in similar fashion to that described above. If the ticket is not valid, then at step 808, an error message is sent to the client device 514, whereupon the client device can try again or terminate the session. If the ticket is valid, then the process performs steps 726 to 742 as described above with respect to FIG. 7.

Figure 9:
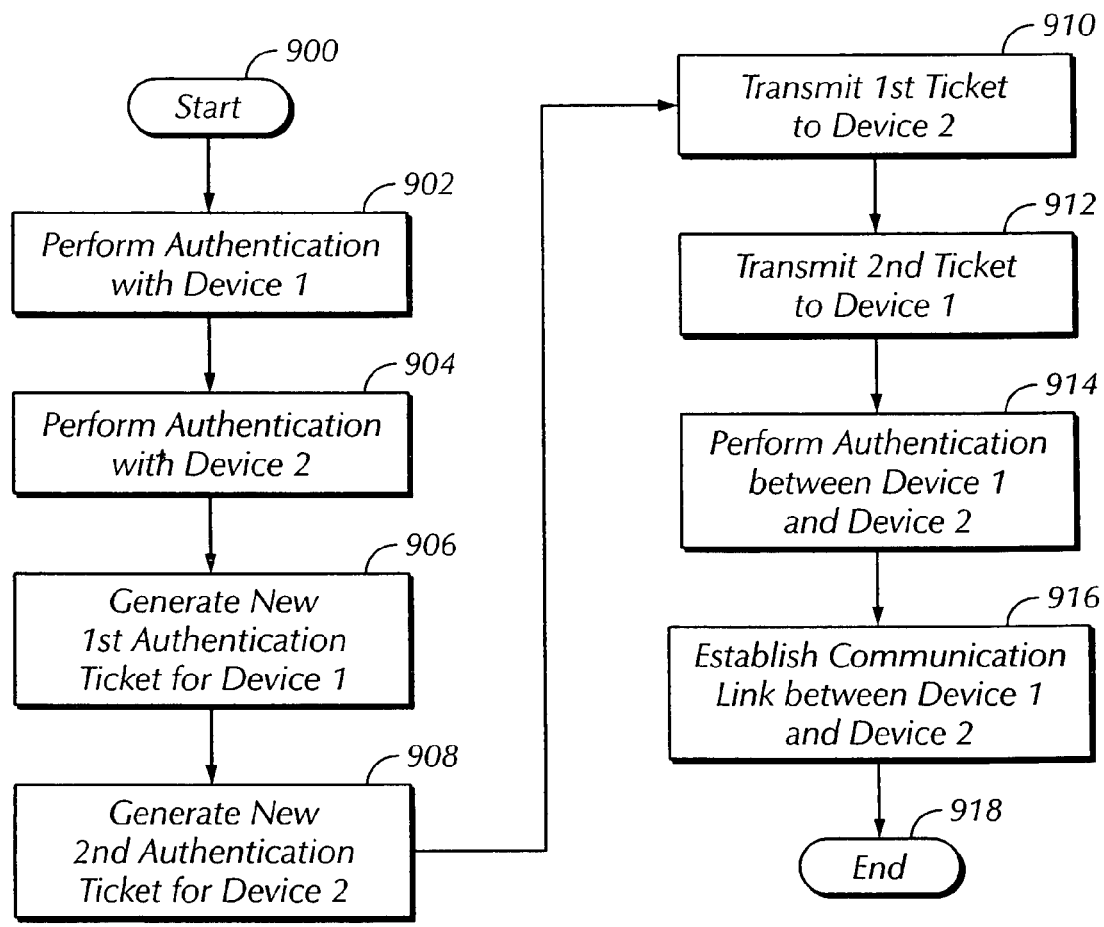
FIG. 9 illustrates a high-level flowchart of a process authenticating two network devices so that they may communicate directly with one another, in accordance with one embodiment of the invention.

As mentioned above, in one embodiment, the Authentication server 522 can also facilitate authentication between two network devices so that they can communicate directly with one another in a secure fashion. FIG. 9 illustrates a high level flowchart for such an authentication process. The process begins at 900 and proceeds to step 902 wherein the Authentication Server 522 performs either a one-way or two-way authentication procedure, as described above, with a first network device to authenticate the first network device. At step 904, the Authentication Server 522 performs either a one-way or two-way authentication procedure with a second network device to authenticate the second network device. At step 906, a new first authentication ticket is generated by the Authentication Server 522 using the secret code of the first network device, as described above. At step 908, a new second authentication ticket is generated by the Authentication Server 522 using the secret code of the second network device, as described above.

At step 910, the Authentication Server 522 transmits the first authentication ticket to the second device. At step 912, the second authentication ticket is sent to the first device. At step 914, either a one-way or two-way authentication procedure is performed between the first and second network devices. Since the first device possesses the second authentication ticket, it can transmit the second ticket to the second device. The second device can then calculate an answer that matches the answer in the second ticket because both used the secret code corresponding to the second device. Similarly, the second device can send the first authentication ticket to the first device and authenticate itself to the first device. If authentication is successfully performed at step 914, a direct communication channel is established between the first and second network devices at step 916.

An exemplary scenario implementing the high-level process of FIG. 9 is now described. In order to establish and authenticate a direct communication link between two network devices (e.g., a client device 514 and video server 510), the Authentication Server 522 first authenticates each of the network devices to ensure they are not imposter devices, using the one-way or two-way authentication ticket exchange procedures described above. Next, if the remote client device 514, for example, requests a video stream from server 510, for example, the Authentication server 522 will generate an authentication ticket corresponding to the video server 510 in a similar fashion to that described above. This authentication ticket will contain an answer and other parameters (e.g., mfr. serial no. of the server 510, distributor identification number, random number, a time stamp, etc.) which are used as inputs along with a secret code corresponding to the server 510 to calculate the answer. As discussed above, the secret code is not contained in the authentication ticket in order to protect against possible interception of the secret code by hackers.

This authentication ticket is then transmitted to the client device 514. The client device 514 then sends this authentication ticket to the video server 510 to authenticate itself and initiate communications with the video server 510.

When the video server 510 receives the authentication ticket from the client device 514, it will calculate its own answer for comparison with the answer on the ticket. If the answers match, the video server 510 determines that the request for communication from the client device 514 is genuine and subsequently establishes a communication link with the client device 514. At this point, the client device 514 can receive from the video server 510 a video stream, or one or more links to one or more cameras 504 associated with the video server 510, as shown in the exemplary illustration provided in FIG. 4.

When two-way authentication is desired, in a further embodiment, the Authentication server 522 further calculates a new authentication ticket for the remote client device 514 and provides this new authentication ticket to the video server 510. The video server 510 then sends this authentication ticket to the remote client device 514. The remote client device 514 will then calculate its own answer using its secret code and the parameter values contained in the authentication ticket and compare its answer with the answer on the ticket. If the answers match, then the remote client device 514 confirms the authenticity of the video server 510 and begins receiving data from the server 510. In this way, the remote client device 514 further ensures the integrity and authenticity of the data it is receiving.

As described above, the invention provides a novel method and system for providing recorded data to remote clients. This data may be archived/stored data or live, real-time streaming data, for example. In further embodiments, the method and system of the invention automatically notifies a designated client of pre-specified sensor triggering events and thereafter enables the client to receive audio and/or visual data from one or more data recording devices associated with the triggered sensor. The invention further provides a novel and robust authentication procedure and protocol for ensuring the security and integrity of the data provided to remote client devices. One of ordinary skill in the art will appreciate that the above descriptions of the preferred embodiments are exemplary only and that the invention may be practiced with modifications or variations of the techniques disclosed above. Those of ordinary skill in the art will know, or be able to ascertain using no more than routine experimentation, many equivalents to the specific embodiments of the invention described herein. Such modifications, variations and equivalents are contemplated to be within the spirit and scope of the present invention as set forth in the claims below.

What is claimed is:

1. A method of notifying a remote client of a sensor triggering event and providing to the remote client data related to the sensor triggering event, the method comprising the steps of:
   receiving a first notification signal indicating that a sensor has been triggered;
   identifying a data recording device associated with the triggered sensor, wherein the data recording device records video data;
   identifying a client device designated to receive the video data when the sensor has been triggered;
   transmitting to the client device a second notification signal indicating that the sensor has been triggered;
   receiving an acknowledgment signal from the client device;
   comparing a first answer calculated by the client device with a second answer which is stored in a device that receives the first answer from the client device wherein the first answer and the second answer are calculated via a pre-specified mathematical formula; and
   transmitting the video data to the client device wherein the first answer matches the second answer.

2. The method of claim 1 wherein the video data is transmitted to the client device in a streaming video data format.

3. The method of claim 1 wherein the video data further comprises audio data.

4. The method of claim 1 wherein the sensor comprises a motion detection sensor.

5. The method of claim 1 wherein the sensor comprises an audio sensor.

6. The method of claim 1 wherein the sensor comprises a temperature sensor.

7. The method of claim 1 wherein the sensor comprises a chemical sensor.

8. The method of claim 1 wherein the sensor comprises a bacteria or virus sensor.

9. The method of claim 1 further comprising the step of:
   transmitting a user selectable link to the remote client device, wherein, upon selection of the user selectable link by a user, said step of transmitting the video data is initiated.

10. The method of claim 1 further comprising the step of:
    transmitting a web page file to the client device, wherein a program executed by the client device opens the file to display a web page on a display screen of the client device, the web page including at least one active link selectable by a user of the client device, which when selected initiates the step of transmitting the data to the client device.

11. The method of claim 10 wherein the data recording device comprises a video camera and the web page comprises at least one window for displaying a video image received from the video camera.

12. The method of claim 10 wherein the data comprises streaming video data.

13. The method of claim 1 further comprising the step of:
    establishing a communication link between the data recording device and the client device, thereby allowing the client device to receive live or recorded data from the data recording device.

14. The method of claim 1 further comprising the step of:
    transmitting to the client device a pre-specified action item list corresponding to the triggered sensor.

15. The method of claim 14 further comprising the step of:
    tracking if and when action items on the action item list have been completed.

16. The method of claim 14 further comprising the step of:
    transmitting at least one hyperlink to the client device wherein selection of the hyperlink facilitates performance of at least one action item on the action item list.

17. A method of notifying a client of an event occurrence, the method comprising the steps of:
    receiving notification of an occurrence of a pre-specified event wherein the occurrence of the pre-specified event is determined by comparing first data recorded by a video camera and second data recorded by the video camera wherein determining a difference between the first data and the second data identifies the occurrence of the pre-specified event;
    receiving video data associated with the pre-specified event;

identifying at least one client device to be contacted as a result of the occurrence of the pre-specified event;

sending a notification signal to the at least one client device;

authenticating the at least one client device; and transmitting the video data to the at least one client device to be displayed on a display screen of the at least one client device.

18. The method of claim 17 wherein the video data is transmitted in a compressed, encrypted and streaming video format.

19. The method of claim 17 wherein the act of sending a notification signal further comprises the step of:

sending to the at least one client device to be displayed on a display screen of the at least one client device a multimedia message (MMS) still image representative of one frame image of the recorded video data.

20. The method of claim 17 wherein the act of sending a notification signal further comprises the step of:

sending a multimedia message (MMS) video file to the at least one client device, wherein the at least one client device executes a player program to open the video file thereby displaying on a display screen of the at least one client device a MMS video representative of at least a portion of the video data.

21. The method of claim 20 wherein the act of sending a notification signal further comprises the step of:

sending an active link to the at least one client device, which when selected by the at least one client device enables it to receive the video data.

22. The method of claim 17 wherein the act of sending a notification signal comprises the step of:

sending a web page file to the at least one client device, wherein the at least one client device executes a player program to open the web page file thereby displaying on a display screen of the at least one client device an interactive web page comprising at least one active link that is selectable to receive the video data.

23. The method of claim 22 wherein the interactive web page further comprises at least one window for displaying at least a portion of the video data.

24. The method of claim 17 further comprising the step of:

establishing a communication link between the data recording device and the client device, thereby allowing the client device to receive live or recorded data from the data recording device.

25. The method of claim 17 further comprising the step of:

transmitting a pre-specified action item list to the client device wherein the pre-specified action item list corresponds to the triggered sensor.

26. The method of claim 25 further comprising the step of:

tracking if and when action items on the action item list have been completed.

27. The method of claim 25 further comprising the step of:

transmitting at least one hyperlink to the client device wherein selection of the hyperlink facilitates performance of at least one action item on the action item list.

28. The method of claim 17 wherein the act of authenticating the at least one client device comprises receiving a username and password transmitted from the at least one client device.

29. The method of claim 17 wherein the act of authenticating the at least one client device comprises the step of:

receiving an identification code from the at least one client device; and comparing the received identification code with a code stored in a memory and associated with the at least one client device.

30. The method of claim 17 wherein the act of authenticating the at least one client device comprises the steps of:

receiving an authentication ticket from the at least one client device, the authentication ticket containing a first answer and at least one parameter value, the first answer being calculated by inputting the at least one parameter value and a first secret code stored in a memory of the at least one client device into a pre-specified mathematical formula, wherein the first secret code is not contained in the authentication ticket;

calculating a second answer by inputting the at least one parameter value and a second secret code stored in a memory of a device that receives the authentication ticket into the pre-specified mathematical formula, wherein the second secret code is correlated with the at least one client device in the memory; and comparing the first answer with the second answer to determine if they match.

31. A remote client device enabled to receive streaming video data, the remote client device comprising a program that when executed performs a method of receiving streaming video data, the method comprising the steps of:

receiving a notification that a sensor has been triggered by an occurrence of one of a plurality of pre-specified events;

transmitting a request to receive video data from a camera coupled to the sensor;

transmitting authentication information to a central server via a digital communications network wherein the authentication information has a first answer which is stored in a memory of the remote client device and a second answer which is stored in the central server wherein the first answer of the remote client device matches the second answer of the central server;

receiving the video data;

displaying a list identifying an action item on a display screen of the remote client device wherein the action item corresponds to the one of the plurality of pre-defined events which triggered the sensor wherein the action item is determined from the one of the plurality of pre-defined events; and displaying the video data on the display screen of the remote client device.

32. The remote client device of claim 31 wherein the video data is received in a streaming video data format.

33. The remote client device of claim 32 wherein the streaming video data is further transmitted in a compressed and encrypted format and the method further comprises decompressing and decrypting the streaming video data prior to displaying it on the display screen.

34. The remote client device of claim 33 wherein the remote client device comprises a wireless telephone.

35. The remote client device of claim 31 wherein the sensor comprises a motion detection sensor.

36. The remote client device of claim 31 wherein the sensor comprises an audio sensor.

37. The remote client device of claim 31 wherein the sensor comprises a temperature sensor.

38. The remote client device of claim 31 wherein the sensor comprises a chemical sensor.

39. The remote client device of claim 31 wherein the sensor comprises a bacteria or virus sensor.

40. The remote client device of claim 31 wherein the act of receiving a notification comprises the step of:

receiving a multimedia message (MMS) still image representative of one frame image of the video data to be displayed on the display of the remote client device.

41. The remote client device of claim 31 wherein the act of receiving a notification comprises the step of:
receiving a multimedia message (MMS) video file, wherein the program executed by the client device opens the video file to display on the display screen of the remote client device a MMS video representative of at least a portion of the video data.

42. The remote client device of claim 31 wherein the act of notifying comprises the step of:
transmitting a web page file to the client device, wherein the program executed by the client device opens the file to display a web page on the display screen of the client device, the web page including at least one active link selectable by a user of the client device, which when selected initiates transmission of the video data to the client device in a streaming video data format.

43. The remote client device of claim 42 wherein the web page comprises at least one window for displaying the streaming video data.

44. The remote client device of claim 31 wherein the act of transmitting authentication information comprises the step of:
transmitting a username and password entered by a user of the client device.

45. The remote client device of claim 31 wherein the act of transmitting authentication information comprises the step of:
transmitting an identification code stored in a memory of the remote client device.

46. The remote client device of claim 31 wherein the act of transmitting authentication information comprises the steps of:
generating an authentication ticket containing a first answer and at least one parameter value, the first answer being calculated by inputting the at least one parameter value and a secret code stored in a memory of the remote client device into a pre-specified mathematical formula, wherein the secret code is not contained in the authentication ticket; and
transmitting the authentication ticket to the central server via the digital communications network, thereby enabling the central server to authenticate the remote client device.

47. A method of notifying a client of an event occurrence, the method comprising the steps of:
receiving notification of an occurrence of a pre-specified event;
receiving video data associated with the pre-specified event;
identifying at least one client device to be contacted as a result of the occurrence of the pre-specified event;
sending a notification signal to the at least one client device;
authenticating the at least one client device; and
transmitting the video data to the at least one client device to be displayed on a display screen of the at least one client device wherein the act of authenticating the at least one client device comprises:
receiving an authentication ticket from the at least one client device, the authentication ticket containing a first answer and at least one parameter value, the first answer being calculated by inputting the at least one parameter value and a first secret code stored in a memory of the at least one client device into a pre-specified mathematical formula, wherein the first secret code is not contained in the authentication ticket;
calculating a second answer by inputting the at least one parameter value and a second secret code stored in a memory of a device that receives the authentication ticket into the pre-specified mathematical formula, wherein the second secret code is correlated with the at least one client device in the memory; and
comparing the first answer with the second answer to determine if they match.

* * * * *